Jan. 25, 1966    N. O. ROSAEN    3,230,971
SELF-INDICATING RELIEF VALVE
Filed April 4, 1963

*INVENTOR.*
NILS O. ROSAEN
BY *Hauke + Hauke*
ATTORNEYS

3,230,971
SELF-INDICATING RELIEF VALVE
Nils O. Rosaen, Bloomfield Hills, Mich. (The Rosaen Filter Co., 1776 E. Nine Mile Road, Hazel Park, Mich.)
Filed Apr. 4, 1963, Ser. No. 270,744
8 Claims. (Cl. 137—556.3)

The present invention relates to fluid systems and more particularly to a self indicating relief valve for use in such a system.

Heretofore, relief valves commonly in use in fluid systems have either consisted of the well known poppet type and ball type check valves or have been of such a complicated construction as to make the cost of manufacturing prohibitive. Although poppet and ball type relief valves are relatively inexpensive to produce and are satisfactory on many fluid system applications, each of these types of valves offer disadvantages which are overcome by the relief valve of the present invention.

In each of these types of valves a spring is utilized to bias the valve member toward a closed position. Since the spring is positioned within the interior of the valve housing it is difficult to replace if it malfunctions or if it is desired to adjust the valve to open and close at a different pressure from that at which the valve was originally set. The construction of such valves makes it difficult to provide an accurate yet simply constructed means to indicate the position of the valve member within the housing. Poppet valves have the added disadvantage that they cannot be used to variably regulate fluid flow in that they move from a fully closed position to a fully open position when the predetermined pressure has been reached.

It is an object of the present invention to provide a relief valve in which the spring may be easily replaced for purposes of either repairing the valve or adjusting the actuating pressure by providing such a valve with the spring disposed exteriorly of the housing.

It is another object of the present invention to improve the operation of fluid systems by providing a variably opening relief valve having means exteriorly of the housing to indicate the degree of opening of the valve.

It is yet another object of the present invention to reduce the costs of producing and maintaining fluid systems by providing an economically produced reliable relief valve.

It is still another object of the present invention to improve relief valves by providing a simply constructed reliable means indicating the degree of opening of the valve member of such relief valves.

Still further objects and advantages will readily occur to one skilled in the art to which the invention pertains upon reference to the following drawings in which like reference characters refer to like parts throughout the several views and in which FIG. 1 is an elevational side view of a preferred relief valve of the present invention.

Figure 1:
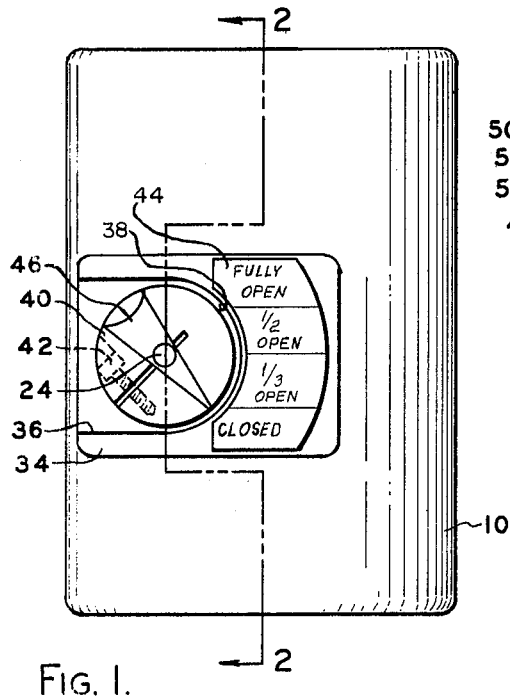

Now referring to the drawings for a more detailed description of the present invention a preferred relief valve is illustrated as comprising a substantially cylindrical housing 10. The housing 10 is preferably provided with an inlet 12 and an outlet 14. An axially extending central passage 16 is provided in the housing 10 connecting the inlet 12 and the outlet 14.

Figure 4:
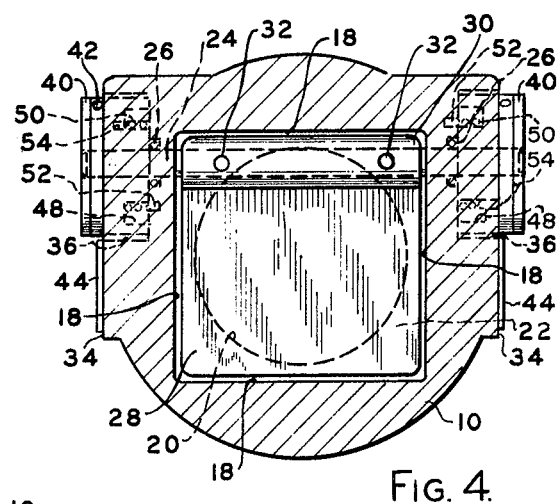
FIG. 4 is a lateral cross sectional view taken substantially on the line 4—4 of FIG. 2.

As can best be seen in FIG. 4 the housing 10 is preferably provided with substantially planar walls 18 which extend axially inwardly from the outlet 14 to form a portion of the central passage 16 which is substantially rectangular in section. The housing 10 is also provided with a substantially annular axially extending surface 20 which extends axially inwardly from the inlet 12. The portion of the central passage 16 formed by the surface 20 is reduced in cross sectional area with respect to that portion of the central passage 16 formed by the walls 18 so that at the juncture of the walls 18 and the surface 20 a radially extending surface 22 is formed facing the outlet 14.

A shaft 24 is journalled at opposite ends in the housing 10 and extends through the central passage 16. As can best be seen in FIGS. 3–4 the shaft 24 is preferably positioned with its longitudinal axis parallel to and closely adjacent one of the walls 18. The shaft 24 is also disposed intermediate the outlet 14 and the surface 22 in a position closely adjacent the surface 22. O-ring seals 26 prevent fluid leakage from the passage 16 along the shaft 24.

Figure 3:
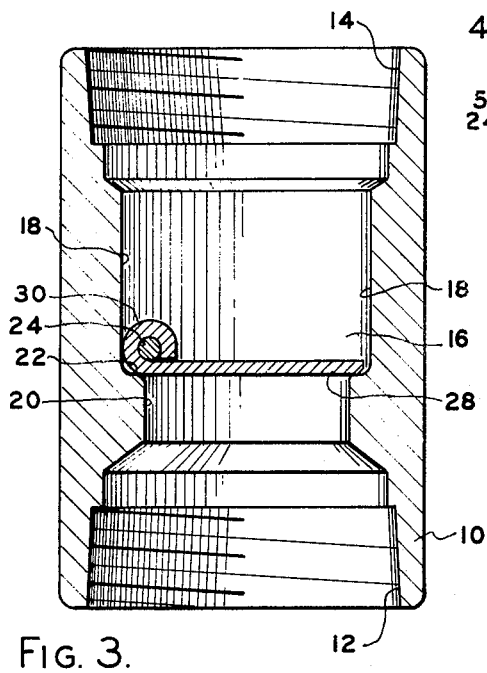
FIG. 3 is a longitudinal cross sectional view taken substantially on the line 3—3 of FIG. 2.

A rectangular valve plate 28 is carried in the passage 16 closely adjacent the surface 22 and preferably comprises an edge portion 30 which, as can best be seen in FIG. 3, is bent around the shaft 24. Screws 32 secure the valve plate 28 to the shaft 24 so that as the shaft 24 rotates, the valve plate 28 will pivot toward and away from seating engagement with the surface 22.

Figure 2:
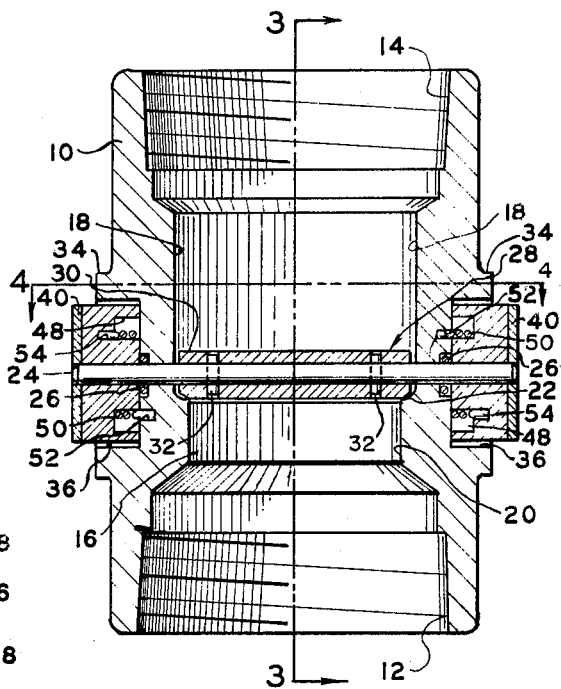
FIG. 2 is a longitudinal cross sectional view taken substantially on the line 2—2 of FIG. 1.

As can best be seen in FIGS. 1, 2 and 4 opposite sides of the housing 10 are preferably provided with raised rectangular portions 34 through which extend opposite ends of the shaft 24. An elongated recess 36 is preferably provided in the portions 34 and is provided with an arcuate wall 38 as can best be seen in FIG. 1. A slotted indicator disc 40 is carried in each of the recesses 36 with each of the discs 40 being secured to the end of the shaft 24 by screws 42. An indicia plate 44 is provided on each of the portions 34 and a pointer 46 is provided on each of the discs 40.

As can best be seen in FIGS. 2 and 4 each of the discs 40 is provided with an annular recess 48. A spring 50 is carried in the recess 48 and has one end engaged in a slot 52 provided in the housing 10 and the other end engaged in a similar slot 54 provided in the disc 40 so that the valve plate 28 will be urged by the springs 50 through the discs 40 and the shaft 24 to pivot into seating engagement with the surface 22.

With the valve plate 28 in the position shown in the drawings, it is apparent that fluid flow will be substantially closed from the inlet 12 to the outlet 14. The pressure of the fluid at the inlet 12 which will open the valve plate 28 is determined by the force of the springs 50 which urge the valve plate 28 toward the closed position. As pressure at the inlet 12 increases to overcome the force of the springs 50, the valve plate 28 will be pivoted to variably open fluid flow through the valve. Pivoting of the valve plate 28 will produce a corresponding rotation of the shaft 24 and the discs 40. The pointers 46 and the indicia on the plates 44 will indicate to the operator of the fluid system the exact position of the valve plate 28.

It is apparent from the foregoing description that the present invention provides a relief valve which although simply and economically constructed will operate to variably open and close fluid flow through the valve. Thus, unlike the poppet valves and similar valves which are now in use, the relief valve of the present invention provides a means of maintaining pressures in the fluid system within a very narrow range.

By positioning the springs 50 exteriorly of the housing 10 a relief valve has been provided which permits the actuating pressures to be readily adjusted. Repairs necessitated by malfunctions of the spring are also more readily facilitated in the relief valve of the present invention than in those heretofore in use with the springs located within the housing.

The present invention also provides a means which accurately indicates the position of the valve. The particular construction disclosed insures reliability of the indicating means.

It is also apparent that although I have described but one embodiment of the present invention many changes and modifications can be made without departing from the spirit of the invention or the scope of the appended claims.

I claim:
1. A relief valve comprising
   (a) a housing having a longitudinal passage and an inlet and an outlet communicating with said passage,
   (b) said housing being provided with a shoulder portion extending inwardly into said passage to define a valve seat surface extending in a plane substantially normal to the axis of said passage,
   (c) valve means pivotally carried by said housing in said passage,
   (d) biasing means carried by said housing and engaging with said valve means to urge same toward said inlet and into seating engagement with said valve seat surface whereby to normally close communication between said inlet and said outlet and to variably open communication only when pressure at said inlet exceeds the force of said biasing means,
   (e) position indicating means carried exteriorly of said housing and operably connected to said valve means to move intermediate a first position and a second position respectively as said valve means moves intermediate a fully opened and a fully closed position, and
   (f) indicia means associated with said position indicating means to indicate the position of said valve means.

2. The relief valve as defined in claim 1 and in which said biasing means are carried exteriorly of said housing.

3. A relief valve for a fluid system comprising
   (a) a substantially cylindrical housing having an inlet at one end, an outlet at the opposite end and a central passage therebetween,
   (b) said passage being rectangular in section and said housing being provided with a shoulder extending inwardly into said passage to define a valve seat surface having a rectangular outer edge, said surface being disposed substantially normal to the axis of said housing and having a circular central opening communicating with said inlet,
   (c) a shaft rotatably carried by said housing and extending through said passage closely adjacent said shoulder,
   (d) a valve plate carried by said shaft and operable upon rotation of said shaft to move from and into seating engagement with said valve seat surface whereby to variably regulate fluid flow through said central opening and from said inlet to said outlet,
   (e) said valve plate having a rectangular peripheral edge disposed closely adjacent the portion of said housing defining said central passage when said valve plate is in a position closing fluid flow through said central opening,
   (f) biasing means carried by said housing and urging said valve plate into seating engagement with said valve seat surface, and
   (g) said shoulder being disposed between said inlet and said valve plate whereby as fluid pressure at said inlet increases above a predetermined value said valve plate will be moved toward an open position to variably open fluid flow from said inlet to said outlet.

4. The relief valve as defined in claim 3 and in which said biasing means comprises a pair of spring members, one of said spring members being connected to one end of said shaft exteriorly of said housing and the other of said spring members being connected to the opposite end of said shaft exteriorly of said housing.

5. A relief valve for a fluid system comprising
   (a) a substantially cylindrical housing having an inlet at one end, an outlet at the opposite end and a central passage therebetween,
   (b) said passage being rectangular in section and said housing being provided with a shoulder extending inwardly into said passage to define a valve seat surface having a rectangular outer edge, said surface extending normal to the axis of said central passage and having a central opening communicating with said inlet,
   (c) a shaft rotatably carried by said housing and extending through said passage closely adjacent said shoulder,
   (d) a valve plate carried by said shaft and operable upon rotation of said shaft to move from and into seating engagement with said valve seat surface whereby to variably regulate fluid flow from said inlet to said outlet,
   (e) biasing means carried by said housing and urging said valve plate into seating engagement with said valve seat surface,
   (f) said shoulder being disposed between said inlet and said valve plate whereby as fluid pressure at said inlet increases above a predetermined value said valve plate will be moved toward an open position to variably open fluid flow from said inlet to said outlet,
   (g) indicator means secured to said shaft exteriorly of said housing and operable to indicate the position of said valve plate, and
   (h) said biasing means comprising a spring having one end secured to the exterior surface of said housing and the other end secured to said indicator means.

6. The relief valve as defined in claim 5 and in which said indicator means comprises
   (a) a position indicating means operably connected to said valve plate by said shaft to move intermediate a first position and a second position respectively as said valve plate moves intermediate a fully opened and a fully closed position, and
   (b) indicia means disposed adjacent said position indicating means and cooperating therewith to indicate the position of said valve.

7. A relief valve for use in a fluid system comprising
   (a) a substantially cylindrical housing having an inlet at one end, an outlet at the opposite end axially aligned with said inlet and an axially extending central passage between said inlet and said outlet,
   (b) said central passage being rectangular in section for a portion thereof leading from said outlet and substantially circular in section for a portion thereof leading from said inlet,
   (c) said rectangular portion and said circular portion of said central passage meeting to form a radially inwardly extending surface facing said outlet,
   (d) a valve plate pivotally carried in said rectangular portion of said central passage closely adjacent said surface and being operable to pivot toward and away from seating engagement with said surface, (e) biasing means urging said valve plate into seating engagement with said surface whereby fluid flow from said inlet to said outlet is substantially closed when the pressure at said inlet is below a predetermined value and said valve plate pivots to variably open fluid flow through said passage when pressure at said inlet increases above said predetermined value.

8. The relief valve as defined in claim 7 and including
(a) a shaft rotatably carried in said housing and carrying said valve plate,
(b) an indicator disc carried by said shaft exteriorly of said housing and rotating with said shaft, and
(c) indicia on said disc and said housing to indicate the position of said valve plate.

References Cited by the Examiner

UNITED STATES PATENTS

| | | | |
|---|---|---|---|
| 1,068,392 | 7/1913 | Knowles | 137—524 |
| 1,613,322 | 1/1927 | Goetz | 137—527 X |
| 2,859,772 | 11/1958 | Weiss | 137—527.8 |
| 3,106,220 | 10/1963 | Hose | 137—527.8 X |

FOREIGN PATENTS

| | | |
|---|---|---|
| 646,340 | 8/1962 | Canada. |
| 480,382 | 5/1916 | France. |
| 264,043 | 1/1927 | Great Britain. |

M. CARY NELSON, *Primary Examiner.*